(12) United States Patent
Casey et al.

(10) Patent No.: US 10,999,649 B2
(45) Date of Patent: *May 4, 2021

(54) AUTO-SUMMARIZING VIDEO CONTENT SYSTEM AND METHOD

(71) Applicant: CenturyLink Intellectual Property LLC, Denver, CO (US)

(72) Inventors: Steven M. Casey, Littleton, CO (US); Felipe Castro, Erie, CO (US); Kevin M. McBride, Lone Tree, CO (US); Ronnie S. Dhaliwal, Centennial, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,469

(22) Filed: Apr. 18, 2018

(65) Prior Publication Data
US 2018/0242053 A1 Aug. 23, 2018

Related U.S. Application Data

(63) Continuation of application No. 15/495,385, filed on Apr. 24, 2017, now Pat. No. 10,003,861, which is a
(Continued)

(51) Int. Cl.
| | |
|---|---|
| *H04N 21/8549* | (2011.01) |
| *H04N 5/765* | (2006.01) |
| *H04N 9/82* | (2006.01) |
| *G11B 27/031* | (2006.01) |
| *G11B 27/10* | (2006.01) |

(Continued)

(52) U.S. Cl.
CPC ....... *H04N 21/8549* (2013.01); *G11B 27/031* (2013.01); *G11B 27/10* (2013.01); *H04N 5/765* (2013.01); *H04N 9/8211* (2013.01); *H04N 21/2393* (2013.01); *H04N 21/4223* (2013.01);
(Continued)

(58) Field of Classification Search
None
See application file for complete search history.

(56) References Cited

U.S. PATENT DOCUMENTS

| | | |
|---|---|---|
| 8,860,882 B2 | 10/2014 | Bloch et al. |
| 9,967,937 B2 | 5/2018 | Robin et al. |

(Continued)

*Primary Examiner* — Heather R Jones
(74) *Attorney, Agent, or Firm* — Lumen Patent Firm

(57) ABSTRACT

Novel tools and techniques are described for auto-summarizing video and/or audio content. In some embodiments, a summary server might retrieve one or more time codes from a time code database, and might analyze the one or more time codes to determine at least one selected time code among the one or more time codes that exceeds a predetermined number of selections. The one or more time codes might correspond to one or more triggers, which might include user-inputted triggers, triggers associated with actions by a live audience, or broadcaster/distributor/producer-provided triggers (i.e., cue tones). The summary server might determine one or more selected segments of video or audio content corresponding to the at least one selected time code, and might create one or more summary tracks, where each of the one or more summary tracks might comprise each of the one or more selected segments of the video or audio content.

12 Claims, 8 Drawing Sheets

Related U.S. Application Data continuation of application No. 13/826,810, filed on Mar. 14, 2013, now Pat. No. 9,667,937.

(51) Int. Cl.
    *H04N 21/239*     (2011.01)
    *H04N 21/422*     (2011.01)
    *H04N 21/4223*     (2011.01)
    *H04N 21/84*     (2011.01)

(52) U.S. Cl.
    CPC ....... *H04N 21/42203* (2013.01); *H04N 21/84* (2013.01)

(56) References Cited

U.S. PATENT DOCUMENTS

| | | | |
|---|---|---|---|
| 2007/0109446 A1* | 5/2007 | Jeong | G11B 27/034 348/563 |
| 2012/0189273 A1* | 7/2012 | Folgner | H04N 9/8227 386/241 |
| 2012/0216121 A1* | 8/2012 | Lin | H04N 21/234327 715/721 |
| 2012/0219271 A1* | 8/2012 | Vunic | G06K 9/00711 386/278 |
| 2013/0343729 A1* | 12/2013 | Rav-Acha | G11B 27/28 386/285 |
| 2014/0270699 A1 | 9/2014 | Casey et al. | |
| 2017/0230730 A1 | 8/2017 | Casey et al. | |
| 2018/0192158 A1* | 7/2018 | Smith | H04N 21/812 |

\* cited by examiner

AUTO-SUMMARIZING VIDEO CONTENT SYSTEM AND METHOD

CROSS REFERENCE TO RELATED APPLICATIONS

This application is a continuation application of U.S. patent application Ser. No. 15/495,385, filed Apr. 24, 2017 by Steven M. Casey et al. and titled, "Auto-Summarizing Video Content System and Method", which is a continuation application of U.S. patent application Ser. No. 13/826,810 (Now U.S. Pat. No. 9,667,937), filed Mar. 14, 2013 by Steven M. Casey et al. and titled, "Auto-Summarizing Video Content System and Method", the disclosures of both of which are hereby incorporated by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a method and system for automatically summarizing video and/or audio content.

BACKGROUND

Today, movie and television show summaries are required to be produced by people watching the movie and/or television shows, and selecting the most popular scenes. Once the scenes are selected, they are compiled together to create a new video sequence for playback. This is a manual and labor intensive process.

Hence, there is a need for more robust solutions for developing video summaries of television shows and the like.

BRIEF SUMMARY

Various embodiments provide systems and techniques for auto-summarizing video and/or audio content. In some embodiments, a remote terminal, at a service provider, might retrieve video and/or audio content from a content database, and might transmit the video and/or audio content to one or more user devices (including, but not limited to, a tablet computer, a smart phone, a mobile phone, a personal digital assistant ("PDA"), a portable gaming device, a gaming console, a desktop computer, a laptop computer, a set-top box ("STB"), a television set (such as a broadcast TV, a high-definition TV ("HDTV"), an Internet Protocol TV ("IPTV"), and/or a digital TV, or the like). A user associated with each user device might enter, using the user device, one or more inputs, including one or more triggers, which might correspond to the user's favorite scene(s) or favorite segment(s) of the video and/or audio content. In some embodiments, the one or more inputs might be associated with actions or sounds recorded from a live audience at a live presentation of a show (e.g., a movie, a play, a live TV broadcast, etc.). In other embodiments, the one or more inputs might include cue tones provided by a broadcaster, a distributor, or a producer of the video and/or audio content. A summary server, which might be located at the service provider, might receive the one or more inputs, might associate the one or more inputs with one or more time codes corresponding to the video and/or audio content, and might store the one or more time codes in a time code database.

The summary server might retrieve the one or more time codes from a time code database, and might analyze the one or more time codes to determine at least one selected time code among the one or more time codes that exceeds a predetermined number of selections from a plurality of users associated with a plurality of user devices. The one or more triggers might include user-inputted triggers, triggers associated with actions by a live audience, or broadcaster/distributor/producer-provided triggers (i.e., cue tones). The summary server might determine one or more selected segments of video or audio content corresponding to the at least one selected time code, and might create one or more summary tracks, where each of the one or more summary tracks might comprise each of the one or more selected segments of the video or audio content. The one or more summary tracks may be compiled into a summary sequence, which might be stored in a summary server and/or might be transmitted to one or more user devices for streaming the summary sequence thereon.

In an aspect, a method might be provided for auto-summarizing video and audio content. The method might comprise a remote terminal, located at a service provider, retrieving video and audio content from a content database, transmitting the video and audio content to at least one user device among a plurality of user devices over a network, and streaming the video and audio content on the at least one user device. The method might further comprise a summary server, located at the service provider, receiving one or more inputs from at least one user among a plurality of users. The plurality of users might be associated with the plurality of user devices, and the one or more inputs might comprise one or more triggers.

The method might comprise the summary server determining one or more time codes each corresponding to each of the one or more triggers, and storing the one or more time codes in a time code database. The method might further comprise the summary server analyzing the one or more time codes to determine at least one selected time code among the one or more time codes that exceeds a predetermined number, and determining one or more selected segments of the video and audio content corresponding to the at least one selected time code. Each of the at least one selected time code might include a central selected time code and a range of time codes spanning a predetermined number of seconds before and after the central selected time code.

The method might further comprise the summary server, creating one or more summary tracks, compiling the one or more summary tracks into a summary sequence, and storing the summary sequence in a summary database. Each of the one or more summary tracks might comprise each of the one or more selected segments. Each of the one or more summary tracks might further comprise at least one of a back-stepped segment of the video and audio content or a forward-stepped segment of the video and audio content.

In another aspect, a method might be provided for auto-summarizing video or audio content. The method might comprise a summary server retrieving one or more time codes from a time code database, and analyzing the one or more time codes to determine at least one selected time code among the one or more time codes that exceeds a predetermined number of selections. Each of the one or more time codes might correspond to each of one or more triggers. The method might further comprise the summary server determining one or more selected segments of video or audio content corresponding to the at least one selected time code, and creating one or more summary tracks. Each of the one or more summary tracks might comprise each of the one or more selected segments of the video or audio content.

In some embodiments, the method might further comprise compiling, with the summary server, the one or more summary tracks into a summary sequence. In some examples, the method might further comprise transmitting, with the summary server, the summary sequence to at least one user device among a plurality of user devices over a network. The plurality of user devices might be associated with a plurality of users.

In yet another aspect, a system might be provided for auto-summarizing video or audio content. The system might comprise a time code database on which is stored one or more time codes. Each of the one or more time codes might correspond to each of one or more triggers. The system might further comprise a summary server operatively coupled with the time code database. The summary server might be configured to retrieve the one or more time codes from the time code database, and analyze the one or more time codes to determine at least one selected time code among the one or more time codes that exceeds a predetermined number of selections. The summary server might be further configured to determine one or more selected segments of video or audio content corresponding to the at least one selected time code, and create one or more summary tracks. Each of the one or more summary tracks might comprise each of the one or more selected segments of the video or audio content.

In some embodiments, the summary server might be further configured to compile the one or more summary tracks into a summary sequence. According to some examples, the summary server might be configured to transmit the summary sequence to at least one user device among a plurality of user devices over a network. The plurality of user devices might be associated with a plurality of users.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
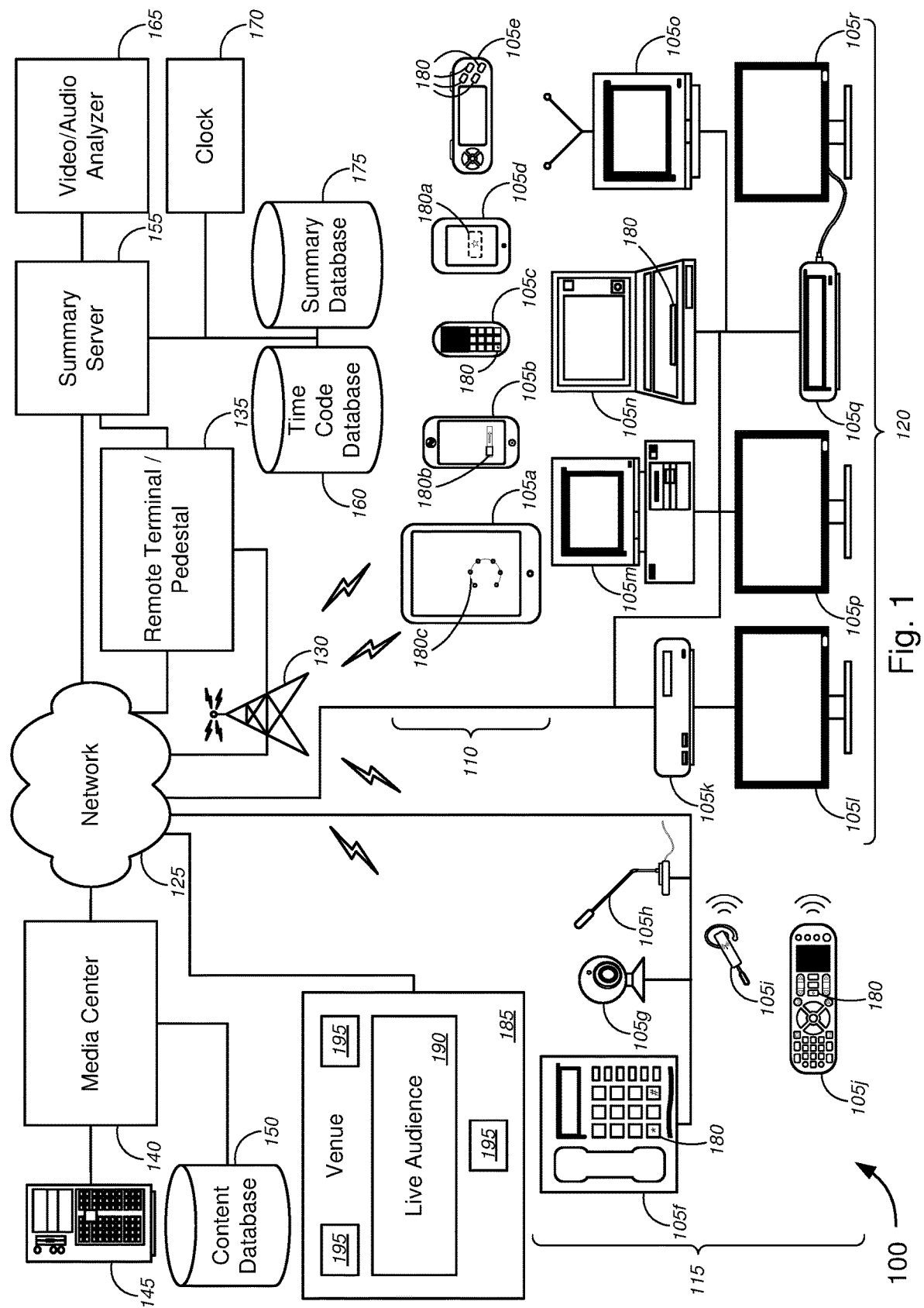
FIG. 1 is a general schematic diagram of a system for auto-summarizing video and/or audio content, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Herein, the term "adaptive bitrate streaming" ("ABR streaming") might refer to a method of video and/or audio content streaming over the Internet or other network (e.g., using HTTP or similar protocol) where the source content is encoded at different bit rates (including, without limitation, high bit rate, medium bit rate, and low bit rate, etc.) and streamed as multiple streams according to bit rate. A streaming client may be made aware of the available streams at different bit rates as well as the segments of the streams by a manifest file. Conditions—including, but not limited to, download speed, current available bandwidth, and the like—might cause a download client to select segments (or packets) from one or the other of the different bit rate bit rate streams. For example, for the first 30 seconds of a video stream, the download speed and/or current available bandwidth might be high. As such, the download client might select multiple segments having segment sizes between 2 and 10 seconds long from the high bit rate stream corresponding to the first 30 seconds of the video stream. In the next 15 seconds of the video stream, the download speed and/or currently available bandwidth might deteriorate. Accordingly, the download client might select multiple segments having segment sizes between 2 and 10 seconds long from the medium bit rate stream corresponding to the video stream between 30 seconds and 45 seconds. In the next 15 seconds of the video stream, the download speed and/or currently available bandwidth might further deteriorate, resulting in the download client selecting from the low bit rate stream corresponding to the video stream between 45 seconds and 60 seconds. In the next 60 seconds of the video stream, the download speed and/or bandwidth might improve significantly, resulting in the download client selecting again from the high bit rate stream corresponding to the video stream between 60 seconds and 120 seconds.

Various embodiments provide systems and techniques for auto-summary video and/or audio content. In some embodiments, a remote terminal, at a service provider, might retrieve video and/or audio content from a content database, and might transmit the video and/or audio content to one or more user devices (including, but not limited to, a tablet computer, a smart phone, a mobile phone, a personal digital assistant ("PDA"), a portable gaming device, a gaming console, a desktop computer, a laptop computer, a set-top box ("STB"), a television set (such as a broadcast TV, a high-definition TV ("HDTV"), an Internet Protocol TV ("IPTV"), and/or a digital TV, or the like). A user associated with each user device might enter one or more inputs, including one or more triggers, which might correspond to the user's favorite scene or favorite segment of the video and/or audio content. In some embodiments, the one or more inputs might be associated with actions or sounds recorded from a live audience at a live presentation of a show (e.g., a movie, a play, a live TV broadcast, etc.). In other embodiments, the one or more inputs might include cue tones provided by a broadcaster, a distributor, or a producer of the video and/or audio content. A summary server, which might be located at the service provider, might receive the one or more inputs, might associate the one or more inputs with one or more time codes corresponding to the video and/or audio content, and might store the one or more time codes in a time code database.

The summary server might retrieve the one or more time codes from a time code database, and might analyze the one or more time codes to determine at least one selected time code among the one or more time codes that exceeds a predetermined number of selections (which might include a set number of selections, a percentage of user selections from among participating users, or the like) from a plurality of users associated with a plurality of user devices. The one or more triggers might include, without limitation, user-inputted triggers, triggers associated with actions by a live audience, or broadcaster/distributor/producer-provided triggers (i.e., cue tones such as SCTE 35 or SCTE 130 cue tones, or the like). In other words, the one or more triggers might correspond to popular scenes or popular segments of the video and/or audio content, and/or might correspond to what the broadcast/distributor/producer deems to be scenes or segments that audiences might enjoy. The summary server might determine one or more selected segments of video or audio content corresponding to the at least one selected time code, and might create one or more summary tracks, where each of the one or more summary tracks might comprise each of the one or more selected segments of the video or audio content. The one or more summary tracks may be compiled into a summary sequence, which might be stored in a summary server and/or might be transmitted to one or more user devices for streaming the summary sequence thereon.

FIGS. 1-8 illustrate some of the features of the method, apparatus, and system for auto-summarizing video and/or audio content, as referred to above. The methods, apparatuses, and systems illustrated by FIGS. 1-8 refer to examples of different embodiments that include various components and steps, which can be considered alternatives or which can be used in conjunction with one another in the various embodiments. The description of the illustrated methods, apparatuses, and systems shown in FIGS. 1-8 is provided for purposes of illustration and should not be considered to limit the scope of the different embodiments.

FIG. 1 is a general schematic diagram of a system 100 for auto-summarizing video and/or audio content, in accordance with various embodiments. In FIG. 1, system 100 might comprise one or more user devices 105, which might be loosely classified as one or more of portable user devices 110, user input devices 115, and/or display/presentation user devices 120. System 100 might further comprise network 125, a telecommunications system 130, a remote terminal or pedestal 135, a media center 140, a media content server 145, a media content database 150, a summary server 155, a time code database 160, a video/audio analyzer 165, a clock 170, and a summary database 175. In some embodiments, system 100 might further comprise a venue 185 (including, without limitation, a television studio, a movie theater, a stage theater, opera house, concert hall, or any other suitable venue at which a live audience might be accommodated), a live audience 190, and one or more recording devices 195 (including, but not limited to, audio recording devices, video cameras, or other suitable devices for capturing actions and/or sounds of the audience members).

In some embodiments, the one or more user devices 105 might comprise one or more of a tablet computer 105*a*, a smart phone 105*b*, a mobile phone 105*c*, a personal digital assistant ("PDA") 105*d*, and/or a portable gaming device 105*e*.

The one or more user devices 105 might, in some cases, comprise one or more of a telephone set 105*f*, an image capturing device 105*g*, a wired audio input device 105*h*, a wireless audio input device 105*i*, and a remote control device 105*j*. The telephone set 105*f* might include one of more of a plain old telephone system ("POTS") telephone, a voice over Internet Protocol ("VoIP") telephone, a landline telephone, or the like, any of which might be a table-top, counter-top, or wall-mounted telephone. The image capturing device 105*g* might include, without limitation, a webcam, a digital camera, an SLR camera, a video camera, or any other suitable image capturing device. The wired audio input device 105*h* might include, but is not limited to, a wired microphone, or the like, while the wireless audio input device 105*i* might include, but is not limited to, a wireless microphone, or the like. The remote control device 105*j* might include, without limitation, a television remote controller, a set-top box remote controller, a universal remote controller, or any other suitable remote control device for any household electronic device, and the like.

In some embodiments, the one or more user devices 105 may comprise one or more of a gaming console 105k, a high-definition ("HD") television 105l, a desktop computer 105m, a laptop computer 105n, a broadcast television 105o, an Internet Protocol television ("IPTV") 105p, a set-top box ("STB") 105q, and a cable television 105r. According to some examples, the HD TV 105l, the broadcast TV 105o, the IPTV 105p, and the cable TV 105r may be interchangeable.

The portable devices 110 may, in some cases, include any one or more of the tablet computer 105a, the smart phone 105b, the mobile phone 105c, the personal digital assistant ("PDA") 105d, and/or the portable gaming device 105e, or any other suitable portable electronic device, and the like.

The user input devices 115, according to some embodiments, might include any one or more of the telephone set 105f, the image capturing device 105g, the wired audio input device 105h, the wireless audio input device 105i, and the remote control device 105j, as well as any of the portable user devices 110, the desktop computer 105m, the laptop computer 105n, or any other suitable electronic, audio (including voice recognition), image-capturing, or mechanical input devices, and the like.

The display/presentation user devices 120 might comprise any of the portable user devices 110, as well as any of desktop computer 105m, laptop computer 105n, or any of the televisions (including, without limitation, HDTV 105l, broadcast TV 105o, IPTV 105p, cable TV 105r, or the like), or any suitable electronic or other device capable of display video images, outputting audio recordings (e.g., music, soundtracks, voice data, and the like).

In operation, there might be two distinct stages for auto-summarizing video and/or audio content. The first stage might include tracking, compiling, tallying, and/or analyzing user input, while the second stage might include creating and compiling a summary sequence of favorite or popular segments of the video and/or audio content, based on the user input or a statistical analysis of user inputs. According to some embodiments, the first and second stages might be performed in sequence by one or more associated parties. In other embodiments, only the first stage or only the second stage may be performed one or more associated parties, while the other of the first or second stage may be performed by other parties.

In some cases, the first stage might comprise one or more users among a plurality of users entering one or more user inputs into one or more user devices 105. The one or more user inputs might comprise one or more triggers. In some embodiments, each trigger might comprise an event including, without limitation, at least one user actuating a button on at least one user device, at least one user providing sound input into a microphone or suitable audio input device of at least one user device, and/or at least one user providing a physical gesture(s) captured by an image or video capturing device, or the like.

In some examples, actuating a button might comprise at least one of depressing a hard button 180 on the at least one user device, interacting with a touchscreen display of the at least one user device, toggling a switch on the at least one user device, and/or actuating a lever on the at least one user device. Interacting with a touchscreen display of the at least one user device might include at least one of actuating one or more soft buttons 180a on the touchscreen display of the at least one user device, swiping a surface or interactive bar 180b of the touchscreen display, and/or drawing a predetermined pattern 180c on the touchscreen display. The sound input, according to some examples, might be received by the wired audio recording device 105h, the wireless audio recording device 105i, or any other suitable sound recording device that is either part of any other user device 105 or used in conjunction with the other user devices 105. The sound input might comprise at least one of one or more user-designated keywords, one or more default keywords, clapping sounds, sounds of laughter, sounds of cheering, sounds of screaming, or sounds of shouting, wherein each of the clapping sounds, laughter, cheering, screaming, and/or shouting exceeds a predetermined decibel level (e.g., exceeding 65 decibels (dB), preferably exceeding 70 dB, more preferably exceeding 80 dB, and in some cases exceeding 90 dB, etc.).

Alternatively, or additionally, the one or more triggers might be associated with actions by a live audience that might be captured by the one or more recording devices 195. For example, the one or more triggers might comprise an action (including, but not limited to, clapping, standing, pointing, mass movement toward person or object, or the like) that might be captured by video cameras, that when analyzed by suitable image/action recognition software executed by a computer system, might function as a trigger. In some cases, the one or more triggers might comprise an action (including, without limitation, an audience clapping, an audience laughing, an audience cheering, an audience screaming, an audience shouting, and an audience whistling, or the like) that might cause a sound level to exceed a predetermined decibel level, where the sound level might be recorded and/or detected by an audio input device. The predetermined decibel level might be a level exceeding 65 dB, preferably exceeding 70 dB, more preferably exceeding 80 dB, and in some cases exceeding 90 dB, or the like.

According to some embodiments, the video or audio content may be encoded with a set of time codes based on clock 170. In other embodiments, the clock 170 might track the run time of the video or audio content being displayed/presented on a user device 105; in such cases, the clock 170 might be the clock of the user device 105 displaying/presenting the video or audio content. In some cases, particularly involving the live audience, the clock 170 might be associated with the recording devices 190 that record the actions/sounds of the live audience, record the show that is presented before the live audience, or both.

In some embodiments, the one or more triggers might be associated with one or more time codes corresponding to segments of the video or audio content. In particular, the one or more triggers might be associated with what the one or more users (or live audience members) consider favorite scenes or segments, or otherwise deem to be of interest in the video or audio content (or in the show being presented), while the one or more time codes might be associated with the particular segments of the video or audio content (or the show being presented) at which the one or more triggers are made. The summary server 155 might receive the one or more triggers from one or more users (i.e., from one or more user devices) or from the venue 185. In some embodiments, the summary server 155 might determine one or more time codes associated with the video or audio content (or show being presented to the live audience 190), each corresponding to the one or more triggers, and might store the one or more time codes in the time code database 160. In some cases, the one or more triggers from one or more users (preferably from a plurality of users) may be stored on a database (e.g., in the time code database 160 with one or more time codes, or in a similar database, or the like).

The summary server 155 might, in some embodiments, analyze the one or more time codes to determine at least one selected time code among the one or more time codes that exceeds a predetermined number. The predetermined number might be a fixed number (e.g., 100, 200, 500, 1000, 10000 users, or the like) or might be a percentage of the number of users sending inputs (e.g., 5%, 10%, 15%, 25%, 50%, 70%, or the like). For example, if 100 users entered user inputs into respective user device 105 in response to viewing a particular movie, and the predetermined number is 30% of users sending inputs for that particular movie, then 30 or more triggers (from 30 or more users) corresponding to a selected time code of about 10 minutes into the movie might result in the summary server 155 determining that the time code of about 10 minutes is popular or otherwise interesting. In some cases, each selected time code might include a central selected time code (based, e.g., on average time codes or mean time codes close to the 10 minute mark) and a range of time codes spanning a predetermined number of seconds (e.g., 1, 2, 5, 10, 15, 30, 45, and 60 seconds, or the like) before and after the central selected time code. The range of time codes takes into account user lag in entering the user input (i.e., the trigger), while more accurately tracking segments of the video or audio content that might be deemed popular or interesting. Once the one or more selected time codes have been determined, the summary server 155 might store the selected one or more time codes in the time code database 160.

In the second stage, the summary server 155, the video/audio analyzer 165, or the summary server 155 using the video/audio analyzer 165 might analyze the video or audio content to determine one or more selected segments of the video and audio content corresponding to the at least one selected time code. In some cases, this might involve retrieving the selected one or more time codes from the time code database 160. Based on this determination, the summary server 155 might create one or more summary tracks, each comprising each of the one or more selected segments. According to some embodiments, each summary track might include a back-stepped segment, a forward-stepped segment, both, or none. Each of the back-stepped segment and the forward-stepped segment might be a segment of the video or audio content that spans a particular period and might have a particular duration, which may include, without limitation a duration of 30 seconds, 1 minute, 1.5 minutes, 2 minutes, 3 minutes, 5 minutes, or 10 minutes, or may include, but is not limited to, a range between 30 seconds and 10 minutes, a range between 30 seconds and 3 minutes, and a range between 2 minutes and 5 minutes, or the like. Embodiments having the back-step and/or forward-step are described in greater detail with respect to FIG. 3 below.

According to some embodiments, the summary server 155 might compile the one or more summary tracks into a summary sequence. In some cases, the summary sequence might be stored in the summary database 175. The remote terminal 135 might, according to some examples, retrieve the summary sequence from the summary database 175 and transmit the summary sequence to at least one user device 105 (such as the portable user devices 110 and/or the display/presentation user devices 120).

In some examples, the creating and compiling of the summary tracks into a summary sequence might take advantage of adaptive bitrate ("ABR") streaming techniques or concepts, as described in greater detail below with respect to FIG. 4.

In some embodiments, in addition or alternative to user-inputted triggers, the one or more triggers might comprise one or more cue tones provided by a broadcaster, distributor, producer, or the like of the video or audio content. In some cases, each of the one or more cue tones might be based on a cue tone standard such as Society of Cable Telecommunications Engineers ("SCTE") standards, including, without limitation the SCTE 35 standard, the SCTE 130 standard, or the like. The use of cue tones is described in greater detail with respect to FIG. 7 below.

The network 125 can be any type of network familiar to those skilled in the art that can support data communications using any of a variety of commercially-available (and/or free or proprietary) protocols, including without limitation TCP/IP and the like. Merely by way of example, the network 125 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers. In some cases, one or more of the remote terminal or pedestal 135, the media center 140, media server 145, summary server 155, and/or video/audio analyzer 165 may each be embodied as one or more server computers. Each of the server computers may be configured with an operating system, including without limitation any of those discussed above, as well as any commercially (or freely) available server operating systems. Each of the servers may also be running one or more applications, which can be configured to provide services to one or more clients 105a through 105r, and/or other servers.

Merely by way of example, one of the servers 145 (or remote terminal 135, media center 140, summary server 155, video/audio analyzer 165, etc.) may be a web server, which can be used, merely by way of example, to process requests for web pages or other electronic documents from the user devices (105a-105r). The web server can also run a variety of server applications, including HTTP servers, FTP servers, CGI servers, database servers, Java servers, and the like. In some embodiments of the invention, the web server may be configured to serve web pages that can be operated within a web browser on one or more of the user devices 105 to perform methods of the invention. The servers 135, 140, 145, 155, and 165 may also function as a middleware server that provides content. For example, middleware servers may include a server for accessing media content and/or data, among other middleware servers. In addition, databases (e.g., one or more of databases 150, 160, and 175) may be embodied as middleware or database servers.

The server computers 135, 140, 145, 155, and 165, in some embodiments, might include one or more application servers, which can be configured with one or more applications accessible by a client running on one or more of the user devices (105a-105r). Merely by way of example, the server(s) 135, 140, 145, 155, and 165 can be one or more general purpose computers capable of executing programs or scripts in response to instructions/requests from the user devices 105, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on one or more user devices 105. In some embodiments, an application server can create web pages dynamically for displaying the information in accordance with various embodiments, such as displaying a selection screen for an on-demand channel(s) as a web page(s). Data provided by an application server may be formatted as one or more web pages (comprising HTML, HTML5, JavaScript, etc., for example) and/or may be forwarded to user devices 105 (as described above, for example). Similarly, a web server might receive web page requests and/or input data from the user devices 105 and/or forward the web page requests and/or input data to an application server. In some cases, a web server may be integrated with an application server.

In accordance with further embodiments, one or more servers 135, 140, 145, 155, and 165 can function as a file server and/or can include one or more of the files (e.g., application code, data files, etc.) necessary to implement various disclosed methods, incorporated by an application running on user devices 105. Alternatively, as those skilled in the art will appreciate, a file server can include all necessary files, allowing such an application to be invoked remotely by one or more the user devices 105.

It should be noted that the functions described with respect to various servers herein (e.g., media content server, etc.) can be performed by a single server and/or a plurality of specialized servers, depending on implementation-specific needs and parameters.

In certain embodiments, the system can include one or more databases including, but not limited to, databases or DBs 150, 160, and 175, as described in greater detail with respect to the figures below. The location of the database(s) 150, 160, and 175 is discretionary: merely by way of example, content database 150 might reside on a storage medium local to (and/or resident in) media center 140 or video server 145. Alternatively, database 150 can be remote from any or all of media center 140 or video server 145, so long as it can be in communication (e.g., via the network 125 or similar network) with one or more of these. Likewise, time code database 160 and/or summary database 175 might reside on a storage medium local to (and/or resident in) summary server 155. Alternatively, database 160 and/or 175 can be remote from summary server 155, as long as they can be in communication (e.g., via network 125 or similar network, with summary server 155.

In a particular set of embodiments, a database 150, 160, and/or 175 can reside in a storage-area network ("SAN") familiar to those skilled in the art. In one set of embodiments, the database 150, 160, and/or 175 can be a relational database, such as an Oracle database, that is adapted to store, update, and retrieve data in response to SQL-formatted commands. The database might be controlled and/or maintained by a database server, as described above, for example.

In addition, various user devices (including, but not limited to, user devices 105a-105r shown in FIG. 1, etc.) might also include a communications subsystem (not shown), which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem may permit data to be exchanged with a network (such as the networks described above, to name one example), with other computer systems, and/or with any other devices described herein.

Figure 2:
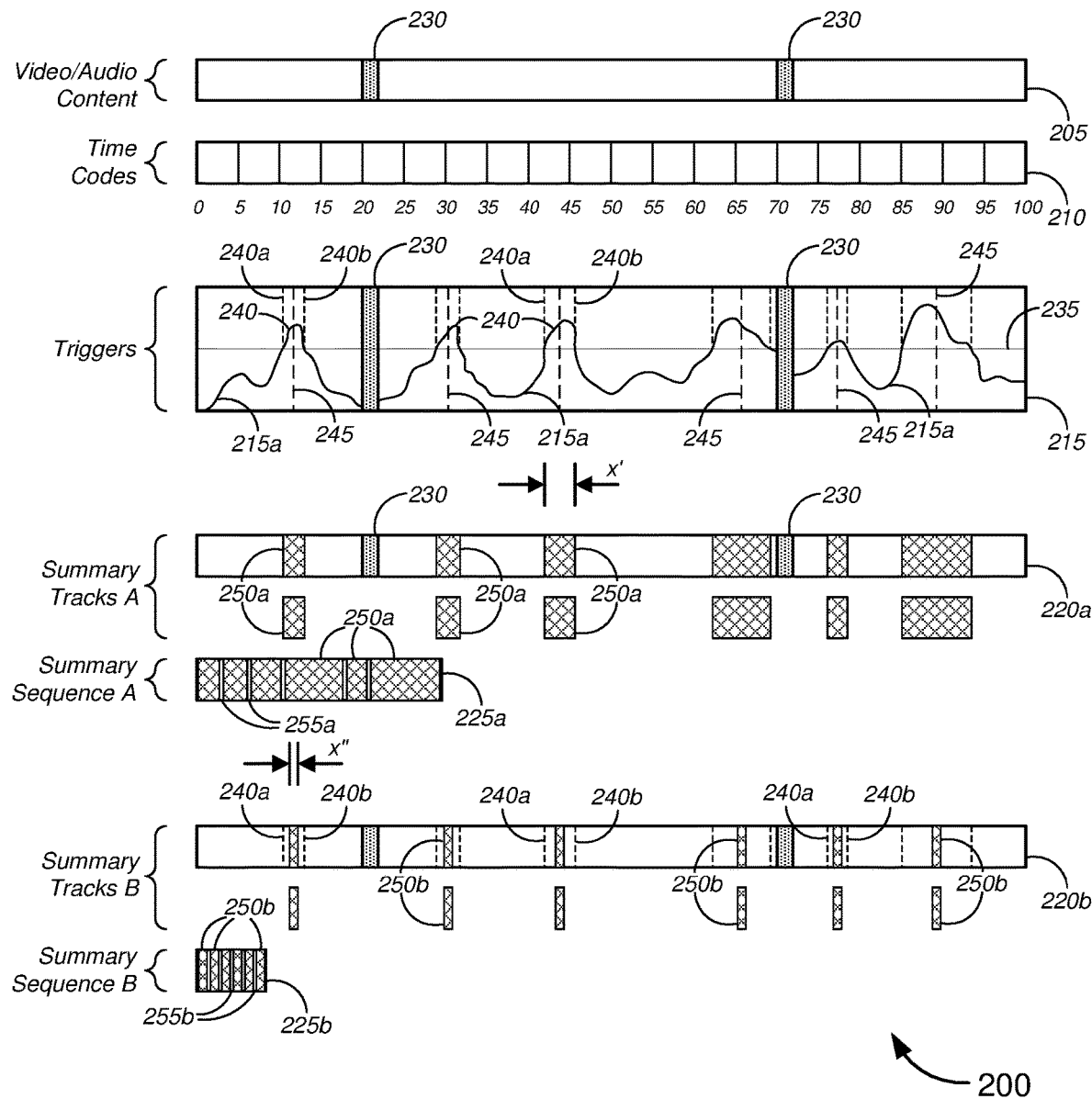
FIG. 2 is a general schematic diagram illustrating an example of automatic creation of summary sequences, in accordance with various embodiments.

FIG. 2 is a general schematic diagram illustrating an example 200 of automatic creation of summary sequences, in accordance with various embodiments. In FIG. 2, example 200 of automatic creation of summary sequences might comprise first transmitting video/audio content 205 to one or more user devices (such as user devices 105 shown in FIG. 1), preferably to a plurality of user devices. In some cases, time codes 210 might be encoded in the video/audio content 105, while in other cases, time codes 210 might be otherwise associated with the video/audio content 205. One or more user inputs might be received from one or more users (preferably a plurality of users) via the one or more user devices (e.g., user devices 105 as described above). The one or more user inputs might include one or more triggers 215. Based on an analysis of the triggers 215, summary tracks 220 might be created, and the summary tracks 220 might be compiled into summary sequences 225.

In some embodiments, such as with broadcast movies or television shows, the triggers received from the users might be associated with time codes corresponding to the actual broadcast times, whereas in other embodiments, because time codes are associated with the video/audio content, the time codes can be separate from any actual broadcast times. As such, issues with download speeds and the like need not be considered. In such cases, each of the responding user devices need not receive the video/audio content 205 or transmit the triggers 215 at the same time as other user devices streaming the same video/audio content 205, for the same segment(s) of video/audio content 205.

FIG. 2 also shows the relative timings associating one or more commercial breaks 230, triggers 215, and selected segments 250 of the video/audio content 205 with respect to time codes 210. For example, video/audio content 205 might include commercial breaks 230 at, e.g., two points (i.e., between time codes 20 and 22 and between time codes 70 and 72) during streaming, broadcast, or transmission of video/audio content 205. Although two commercial breaks 230 are shown, the various embodiments allow for any number of commercial breaks 230. Time codes 210 might represent seconds, minutes, fractions seconds, minutes, or percentage of the length/duration of the video/audio content, or the like. During streaming, broadcast, or transmission of video/audio content 205, a plurality of users might enter user inputs including one or more triggers 215 (which might comprise, without limitation, button presses, audio inputs, or the like as described in detail above), which are shown as line graph 215a. Line graph 215a might represent the number of user-inputted triggers from among the plurality of users using the plurality of user devices, where the number of triggers might correspond to the time codes 210 for the particular video/audio content 205. In FIG. 2, line graph 215a might comprise a plurality of peaks 240 that exceed a threshold value 235—which might include, without limitation, a predetermined number or predetermined percentage of user inputs counted from the number of users who enter inputs, as described in detail above. For example, FIG. 2 shows six peaks 240, each having a peak start 240a and a peak end 240b of the respective peak 240, each of the peak start 240a and peak end 240b defining an intersection of the line graph 215a and the threshold level 235. Each peak 240 might have a central peak portion 245, which could represent one of a mean value, an average value, a maximum value, or other statistically significant value of the time codes corresponding to the triggers 215.

Summary tracks 220, which might be created based on an association of each peak or each central peak portion 245 with time codes 210 and the video/audio content 205, might include summary tracks A 220a and summary tracks B 220b. In FIG. 2, summary tracks A 220a might include one or more selected segments 250a of video/audio content 205, each corresponding to one of the six peaks 240, and each having a duration x' corresponding to the difference between peak end 240b and peak start 240a for each respective peak 240. Each of the one or more selected segments 250a might be compiled to create summary sequence A 225a. Summary sequence A 225a might comprise intervals 255a between each selected segment 250a. In some cases, the intervals 255a might be zero seconds in length or 1, 2, or a few seconds in length.

Likewise, summary tracks B 220b might include one or more selected segments 250b of video/audio content 205, each corresponding to one of the six peaks 240, and each of the one or more selected segments 250b might be compiled to create summary sequence B 225b. Each selected segment 250b might have a duration x" corresponding to a nominal width of the segment 250b centered about the central peak portion 245. In some cases, the nominal width (i.e., duration x") might include a few seconds (e.g., 1, 2, 3, 5, 10, or 15 seconds, etc.) of the video/audio content 205. Similar to summary sequence A 225a, summary sequence B 225b might comprise intervals 255b between each selected segment 250b. In some embodiments, the intervals 255b might be zero seconds in length or 1, 2, or a few seconds in length.

Figure 3:
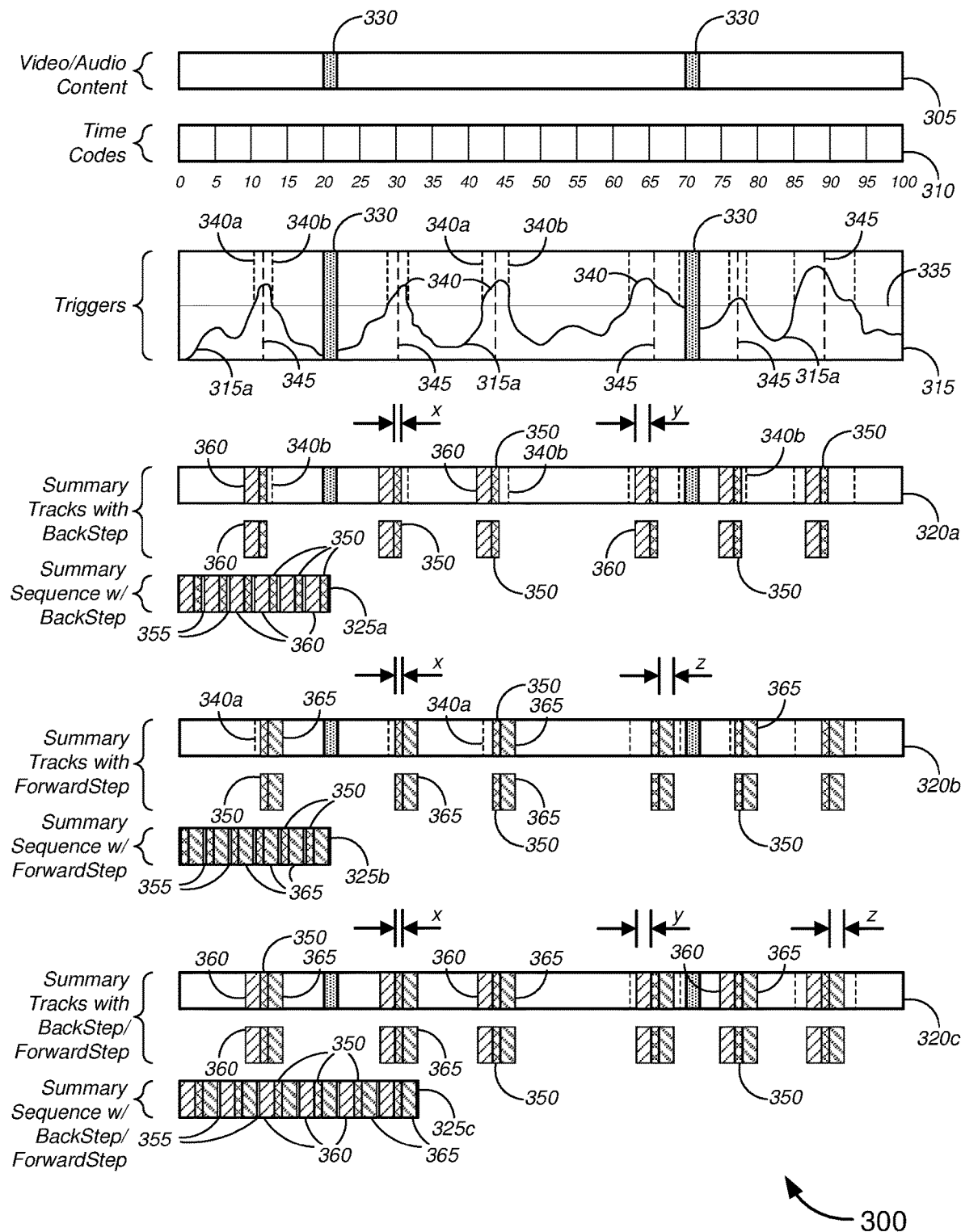
FIG. 3 is a general schematic diagram illustrating an example of automatic creation of summary sequences having back-stepped segments and/or forward-stepped segments, in accordance with various embodiments.

FIG. 3 is a general schematic diagram illustrating an example 300 of automatic creation of summary sequences having back-stepped segments and/or forward-stepped segments, in accordance with various embodiments. In FIG. 3, the video/audio content 305, the time codes 310, the triggers 315, line graph 315a, commercial breaks 330, peaks 340, peak start 340a, peak end 340b, central portions of the peak 345, and the one or more selected segments 350 might be the same or similar to the video/audio content 205, the time codes 210, the triggers 215, line graph 215a, commercial breaks 230, peaks 240, peak start 240a, peak end 240b, central portions of the peak 245, and the one or more selected segments 250, respectively, as described above with respect to FIG. 2.

In FIG. 3, summary tracks 320 might comprise a back-stepped segment 360, a forward-stepped segment 365, or both that extend backward in time and forward in time with respect to each of the one or more selected segments 350. Such step-back and step-forward features allow some transition before and after the popular or favorite segments (i.e., selected segments 350), and provides some context to the popular or favorite segments.

In some embodiments, summary tracks with BackStep 320a might comprise a back-stepped segment 360 that extends backward in time from each selected segment 350, which might correspond to either selected segments 250a or 250b as described above with respect to FIG. 2. Compiling the summary tracks 320a, the resultant summary sequence with BackStep 325a might comprise one or more back-stepped segment-selected segment pairs, which might correspond to each peak 340. The summary sequence 325a might further comprise intervals 355 between each back-stepped segment-selected segment pair. In some embodiments, the intervals 355 might be zero seconds in length or 1, 2, or a few seconds in length.

According to some embodiments, instead of a back-stepped segment 360, a forward-stepped segment 365 might be included that extends forward in time from each selected segment 350. For example, summary tracks with Forward-Step 320b might comprise one or more selected segment-forward-stepped segment pairs each corresponding to each peak 340. Compiling the summary tracks 320b, the resultant summary sequence with ForwardStep 325b might comprise one or more selected segment-forward-stepped segment pairs and intervals 355 between each selected segment-forward-stepped segment pair.

In other embodiments, both a back-stepped segment 360 and a forward-stepped segment 365 might be included that extends backward in time and forward in time, respectively, from each selected segment 350. For example, summary tracks with BackStep/ForwardStep 320c might comprise one or more back-stepped segment-selected segment-forward-stepped segment combinations each corresponding to each peak 340. Compiling the summary tracks 320b, the resultant summary sequence with BackStep/ForwardStep 325c might comprise one or more back-stepped segment-selected segment-forward-stepped segment combinations and intervals 355 between each back-stepped segment-selected segment-forward-stepped segment combination.

Each selected segment 350 might have a duration x, which might correspond to duration x' or duration x" as described above with respect to FIG. 2. Each back-stepped segment 360 might have a duration y, while each forward-stepped segment 365 might have a duration z. Each of duration y or duration z might be 30 seconds, 1 minute, 1.5 minutes, 2 minutes, 3 minutes, 5 minutes, or 10 minutes in length, or might be a range between 30 seconds and 10 minutes, a range between 30 seconds and 3 minutes, and a range between 2 minutes and 5 minutes in length.

Figure 4:
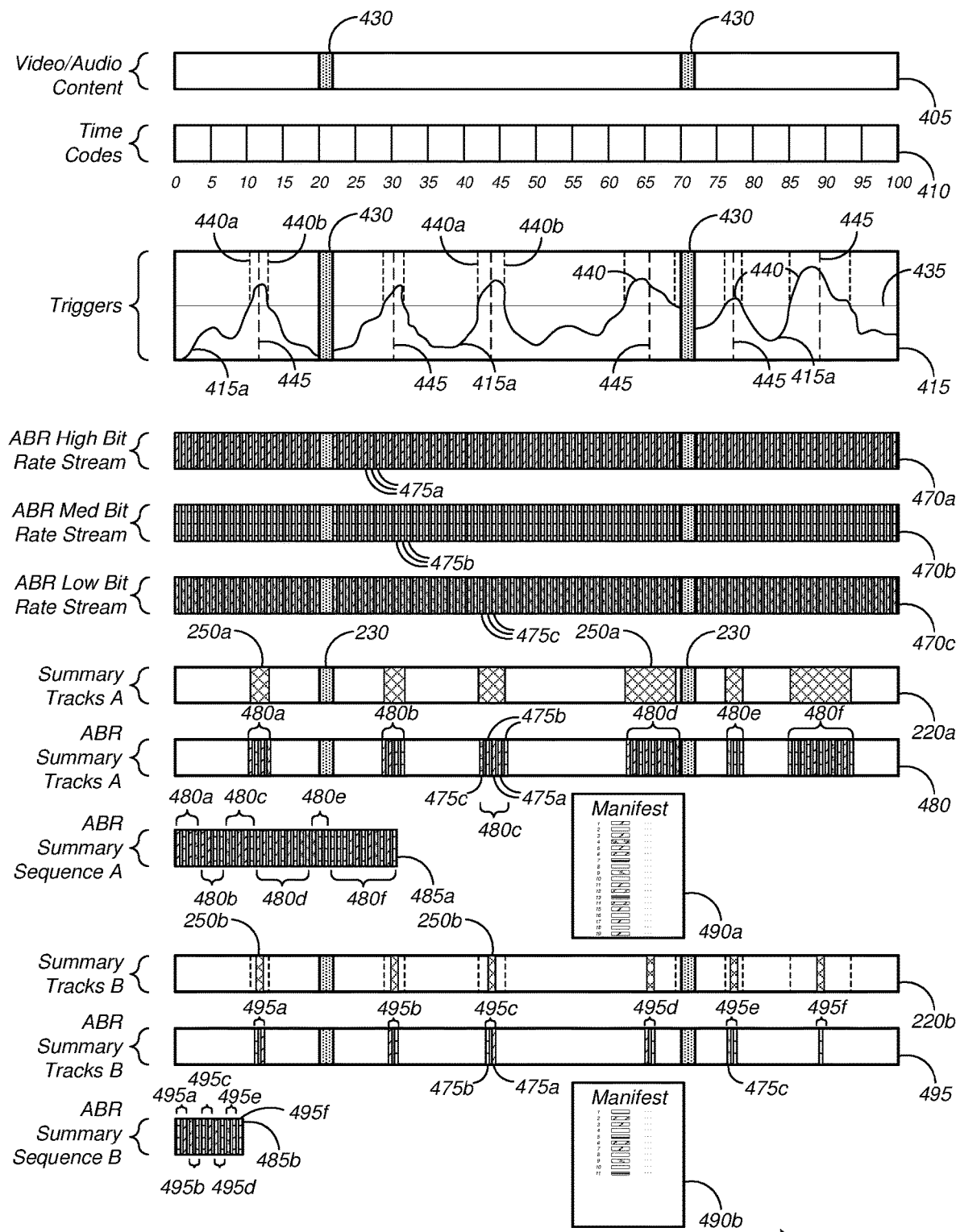
FIG. 4 is a general schematic diagram illustrating an example of automatic creation of summary sequences using ABR streams, in accordance with various embodiments.

FIG. 4 is a general schematic diagram illustrating an example 400 of automatic creation of summary sequences using ABR streams, in accordance with various embodiments. In FIG. 4, the video/audio content 405, the time codes 410, the triggers 415, line graph 415a, commercial breaks 430, peaks 440, peak start 440a, peak end 440b, central portions of the peak 445, and the one or more selected segments 450 might be the same or similar to the video/audio content 205, the time codes 210, the triggers 215, line graph 215a, commercial breaks 230, peaks 240, peak start 240a, peak end 240b, central portions of the peak 245, and the one or more selected segments 250, respectively, as described above with respect to FIG. 2.

Today, the most common format for mobile video content is ABR streaming. These systems are now beginning to be offered for set-top box ("STB") and television viewing systems. Various embodiments herein take advantage of the nature of standard ABR streams to make it very easy to change (full) live streamed video (or audio) content into video (or audio) on demand assets. For example, a live video stream might be made up of a series of 2-10 second segments, which might be played back from a playlist called a "manifest file." The manifest file contains all the segments that make up the stream. The various embodiments identify the selected segments 250 of the video/audio 405, and capture the ABR segments 480, 495 corresponding to these selected segments 250 as they are sent for playback and uses these to "build" the video on demand ("VOD") file or audio on demand ("AOD") file. The system then creates a new manifest file 490 with the captured ABR segments 480, 495 to create the "whole" or entire VOD or AOD file. As with standard ABR streaming, there is no need to re-encode the file. It is simply a matter of capturing the segments and making a new manifest file. This process of utilizing the nature of ABR streaming is shown in greater detail in FIG. 4.

With reference to FIG. 4, multiple bit rate streams 470 are shown, which might include a high bit rate stream 470a, a medium bit rate stream 470b, and a low bit rate stream 470c. The high bit rate stream 470a might comprise a plurality of high bit rate segments 475a corresponding to the video/audio content 405. Similarly, the medium bit rate stream 470b might comprise a plurality of medium bit rate segments 475b corresponding to the video/audio content 405. Likewise, the low bit rate stream 470b might comprise a plurality of low bit rate segments 475b corresponding to the video/audio content 405. As with standard ABR, the client (or in this case, the summary server 155 or remote terminal 135 might adapt the streaming of the ABR segments 475 according to the current bandwidth, download speeds, and the like of each user device 105 to which the summary sequence is to be transmitted/streamed.

Taking the examples as shown in FIG. 2, for instance, for each selected segment 250a in summary tracks A 220a, corresponding ABR segments 480 may be compiled. To adapt to changing current bandwidths or download speeds of the clients (i.e., the user devices 105 requesting summary sequences), each of the ABR segments 480 might comprise different bit rate segments 475. For example, as shown in FIG. 4, ABR segment 480c might comprise a low bit rate segment 475c followed by a medium bit rate segment 475b, followed by two high bit rate segments 475a, followed by a second medium bit rate segment 475b corresponding to selected segment 250a associated with the third peak 240. The ABR segments 480a-480f might be compiled into ABR summary sequence A 485a, and a manifest file 490a might be created for summary sequence A 485a.

Similarly, for each selected segment 250b in summary tracks B 220b, corresponding ABR segments 495 may be compiled, where each of the ABR segments might comprise different bit rate segments 475. For example, as shown in FIG. 4, ABR segment 495c might comprise a medium bit rate segment 475b followed by a high bit rate segment 475a corresponding to selected segment 250b associated with the third peak 240. The ABR segments 495a-495b might be compiled into ABR summary sequence B 485b, and a manifest file 490b might be created for summary sequence B 485b.

Figure 5:
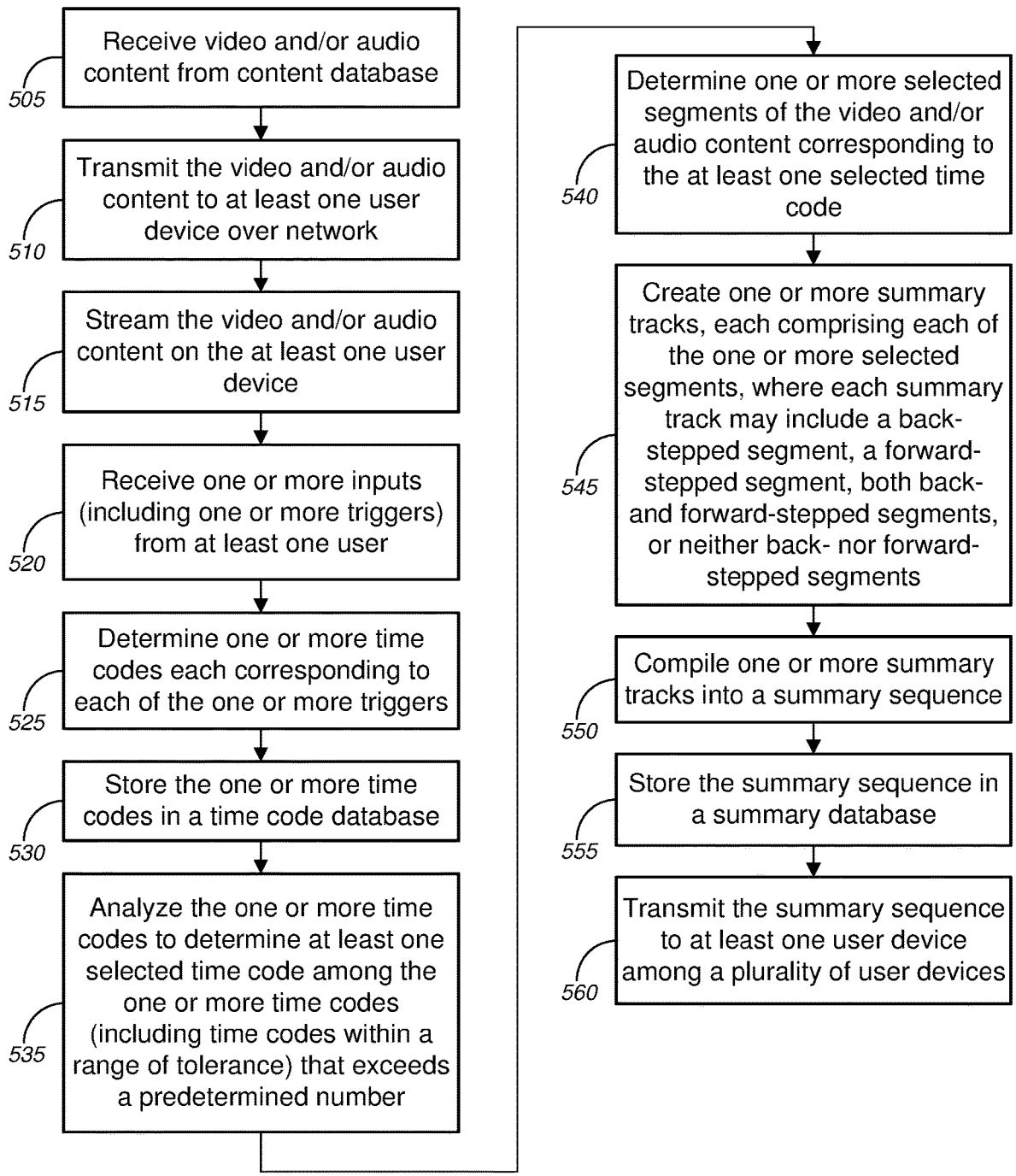
FIG. 5 is a flow chart illustrating an exemplary process of auto-summarizing video and/or audio content, in accordance with various embodiments.

FIG. 5 is a flow chart illustrating an exemplary process 500 of auto-summarizing video and/or audio content, in accordance with various embodiments. In FIG. 5, process 500 might comprise, at block 505, a remote terminal (e.g., remote terminal 135) receiving video and/or audio content (e.g., video/audio content 205, 305, 405) from a content database (e.g., content database 150 shown in FIG. 1) via a media center and/or media content server (e.g., media center 140 and media content server 145 shown in FIG. 1). The remote terminal might, at block 510, transmit the video and/or audio content to at least one user device (e.g., user device 105, such as portable user devices 110 and display/presentation user devices 120, or the like) over a network (e.g., network 125), and might stream the video and/or audio content on the at least one user device (block 515).

At block 520, the summary server (e.g., summary server 155) might receive one or more inputs, which might include one or more triggers (as described in detail above), from at least one user associated with the at least one use device. The summary server, at block 525, might determine one or more time codes each corresponding to each of the one or more triggers, and might store, at block 530, the one or more time codes in a time code database (e.g., time code database 160). The summary server might analyze the one or more time codes, in some cases using a video/audio analyzer (e.g., video/audio analyzer 185) to determine at least one selected time code among the one or more time codes that exceeds a predetermined number (block 535). The at least one selected time code might be determined within a range of tolerance, in order to account for user input lag or the like. For example, each selected time code might include a central selected time code (which might correspond to an average, a mean, a maximum or other statistically number of triggers, or the like), and a range of time codes spanning a predetermined number of seconds (e.g., 1, 2, 3, 4, 5, or 10 seconds, or the like) before and after the central selected time code. According to some embodiments, the predetermined number might be a fixed number (e.g., 100, 200, 500, 1000, 10000 users, or the like) or might be a percentage of the number of users sending inputs (e.g., 5%, 10%, 15%, 25%, 50%, 70%, or the like).

At block 540, the summary server might determine one or more selected segments of the video and/or audio content corresponding to the at least one selected time code. The summary server might, at block 545, create one or more summary tracks, each comprising each of the one or more selected segments. Each summary track might include a back-stepped segment, a forward-stepped segment, or both segments (as shown in FIG. 3), or might include neither the back-stepped segment nor the forward-stepped segment (as shown in FIG. 2).

The summary server might compile the one or more summary tracks into a summary sequence (block 550), and might, in some cases, store the summary sequence in a summary database (e.g., summary database 175) (block 555). According to some embodiments, the summary server might, at block 560, transmit the summary sequence to at least one user device among a plurality of user devices for streaming the summary sequence thereon. In some cases, the at least one user device at block 560 might be the same as the at least one user device at block 510. In other examples, the at least one user device at block 560 might be different from the at least one user device at block 510.

Figure 6:
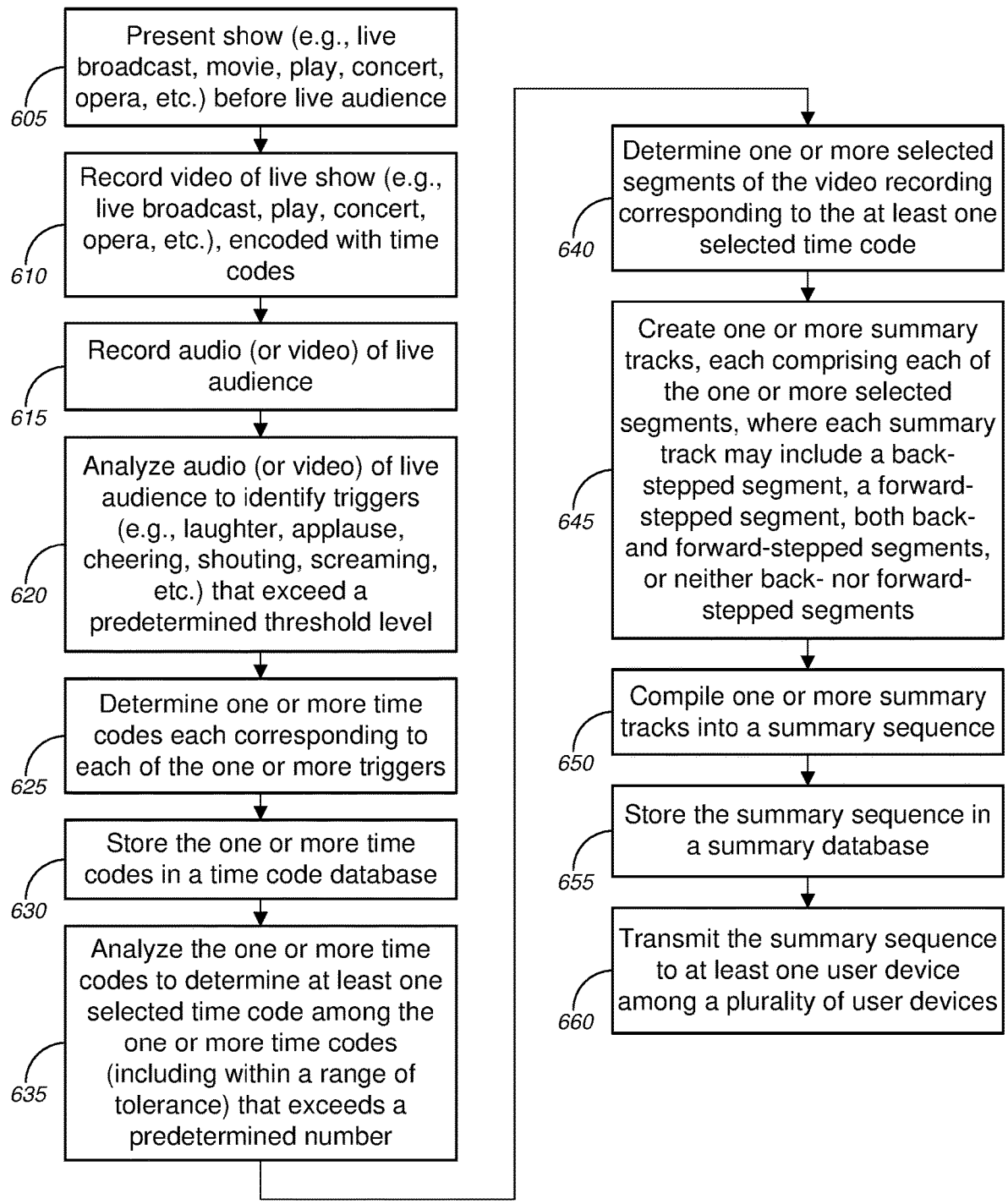
FIG. 6 is a flow chart illustrating an exemplary process of auto-summarizing shows that are presented before a live audience, in accordance with various embodiments.

FIG. 6 is a flow chart illustrating an exemplary process 600 of auto-summarizing shows that are presented before a live audience, in accordance with various embodiments. In FIG. 6, process 600 might comprise, at block 605, a show being presented at a suitable venue (e.g., venue 185) before a live audience (e.g., live audience 190). In some embodiments, the show might include, without limitation, one of a live broadcast, a movie, a play, a concert, an opera, or the like, which might be presented at a venue, including, but not limited to, a corresponding one of a television studio, a movie theater, a stage theater, a concert hall, an opera house, or the like. At block 610, a video recording of the live presentation of the show might be performed (e.g., using video/audio recording devices 195), particularly focused on the show being presented (e.g., the television show being taped, the movie being played, the play being videotaped, the concert being recorded, the opera being recording, or the like). In some cases, the video recording might be encoded with time codes (as discussed above).

At block 615, a video or audio recording might be made of the live audience (e.g., using video/audio recording devices 195). A summary server (e.g., summary server 155) might, at block 620, analyze the video or audio recording of the live audience to identify one or more triggers (e.g., laughter, applause, cheering, shouting, screaming, or the like) that exceed a predetermined threshold level. In some embodiments, video analysis software programs might be used to analyze video recordings of the live audience to determine a trigger action including, but not limited to, clapping, standing, pointing, mass movement toward a person(s) or object(s) or the like that exceed a predetermined threshold level, which might include, without limitation, a certain pre-set number of people performing acts that might be classified as one or more of the trigger actions mentioned above, or the like. In other embodiments, the one or more triggers might comprise an action that might cause a sound level to exceed a predetermined decibel level; such actions might include, without limitation, an audience clapping, an audience laughing, an audience cheering, an audience screaming, an audience shouting, and an audience whistling, or the like. The predetermined decibel level might be a level exceeding 65 dB, preferably exceeding 70 dB, more preferably exceeding 80 dB, and in some cases exceeding 90 dB, or the like.

The summary server, at block 625, might determine one or more time codes each corresponding to each of the one or more triggers, and might store, at block 630, the one or more time codes in a time code database (e.g., time code database 160). The summary server might analyze the one or more time codes, in some cases using a video/audio analyzer (e.g., video/audio analyzer 185) to determine at least one selected time code among the one or more time codes that exceeds a predetermined number (block 635). The at least one selected time code might be determined within a range of tolerance, in order to account for user input lag or the like. For example, each selected time code might include a central selected time code (which might correspond to an average, a mean, a maximum or other statistically number of triggers, or the like), and a range of time codes spanning a predetermined number of seconds (e.g., 1, 2, 3, 4, 5, or 10 seconds, or the like) before and after the central selected time code. According to some embodiments, the predetermined number might be a fixed number (e.g., 100, 200, 500, 1000, 10000 users, or the like) or might be a percentage of the number of users sending inputs (e.g., 5%, 10%, 15%, 25%, 50%, 70%, or the like).

At block 640, the summary server might determine one or more selected segments of the video recording corresponding to the at least one selected time code. The summary server might, at block 645, create one or more summary tracks, each comprising each of the one or more selected segments. Each summary track might include a back-stepped segment, a forward-stepped segment, or both segments (as shown in FIG. 3), or might include neither the back-stepped segment nor the forward-stepped segment (as shown in FIG. 2).

The summary server might compile the one or more summary tracks into a summary sequence (block 650), and might, in some cases, store the summary sequence in a summary database (e.g., summary database 175) (block 655). According to some embodiments, the summary server might, at block 660, transmit the summary sequence to at least one user device among a plurality of user devices (e.g., user devices 105 shown in FIG. 1) for streaming the summary sequence thereon.

Figure 7:
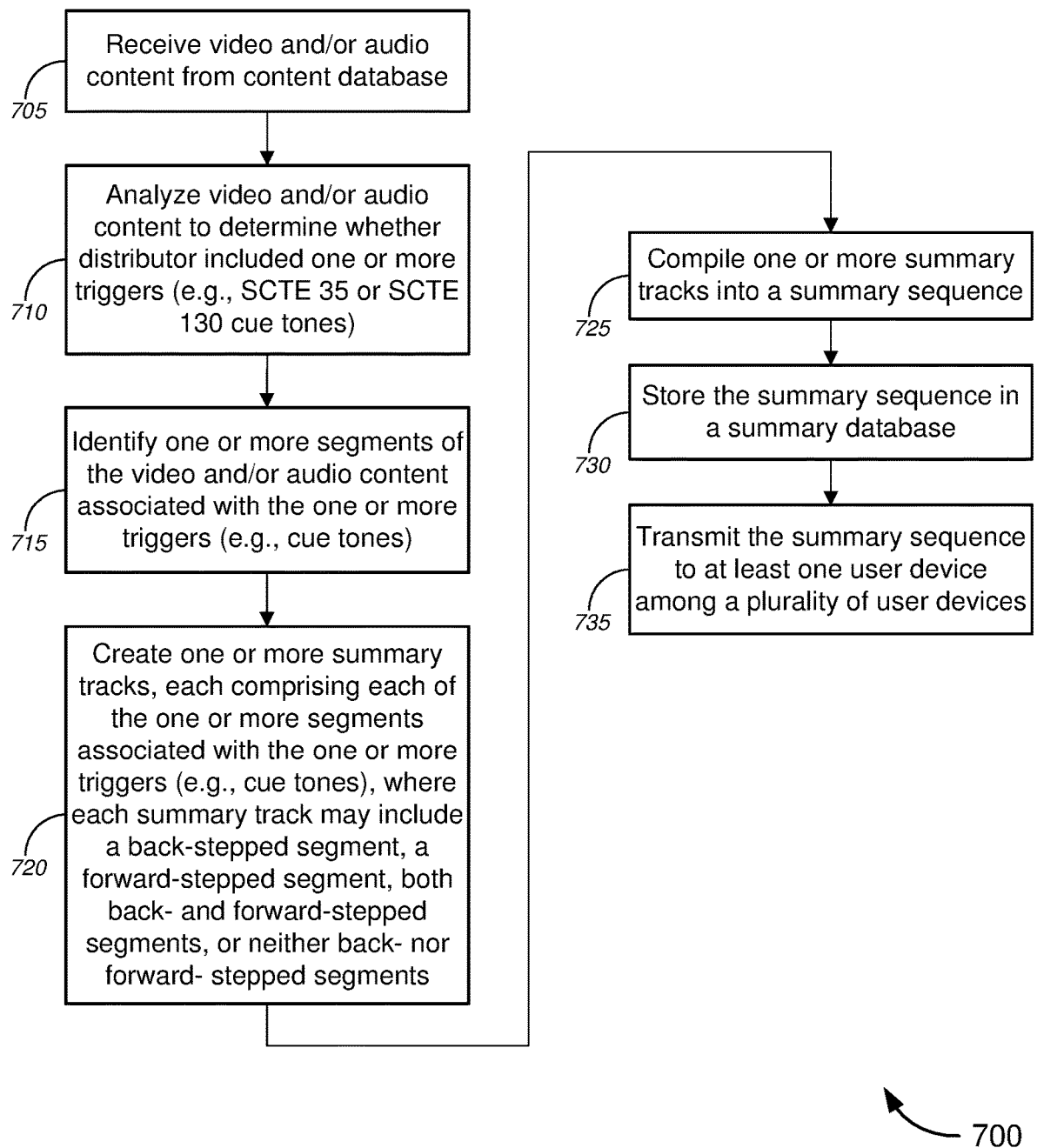
FIG. 7 is a flow chart illustrating an exemplary process of auto-summarizing video and/or audio content having embedded triggers, in accordance with various embodiments.

FIG. 7 is a flow chart illustrating an exemplary process 700 of auto-summarizing video and/or audio content having embedded triggers, in accordance with various embodiments. In FIG. 7, process 700 might comprise, at block 705, a remote terminal (e.g., remote terminal 135) receiving video and/or audio content (e.g., video/audio content 205, 305, 405) from a content database (e.g., content database 150 shown in FIG. 1) via a media center and/or media content server (e.g., media center 140 and media content server 145 shown in FIG. 1). The remote terminal might, at block 710, analyze the video and/or audio content to determine whether the distributor/producer of the video and/or audio content included one or more triggers (e.g., SCTE 35 or SCTE 130 cue tones, or the like).

At block 715, the summary server (e.g., summary server 155) might identify one or more segments of the video and/or audio content associated with the one or more triggers (e.g., SCTE 35 or SCTE 130 cue tones, or the like). The summary server might, at block 720, create one or more summary tracks, each comprising each of the one or more segments associated with the one or more triggers (e.g., cue tone or the like). In some embodiments, each summary track might include a back-stepped segment, a forward-stepped segment, or both segments (as shown in FIG. 3), or might include neither the back-stepped segment nor the forward-stepped segment (as shown in FIG. 2).

At block 725, the summary server might compile the one or more summary tracks into a summary sequence, and might, at block 730, store the summary sequence in a summary database (e.g., summary database 175). In some cases, the summery server might transmit the summary sequence to at least one user device among a plurality of user devices (e.g., user devices 105 shown in FIG. 1) for streaming the summary sequence thereon (block 735).

Figure 8:
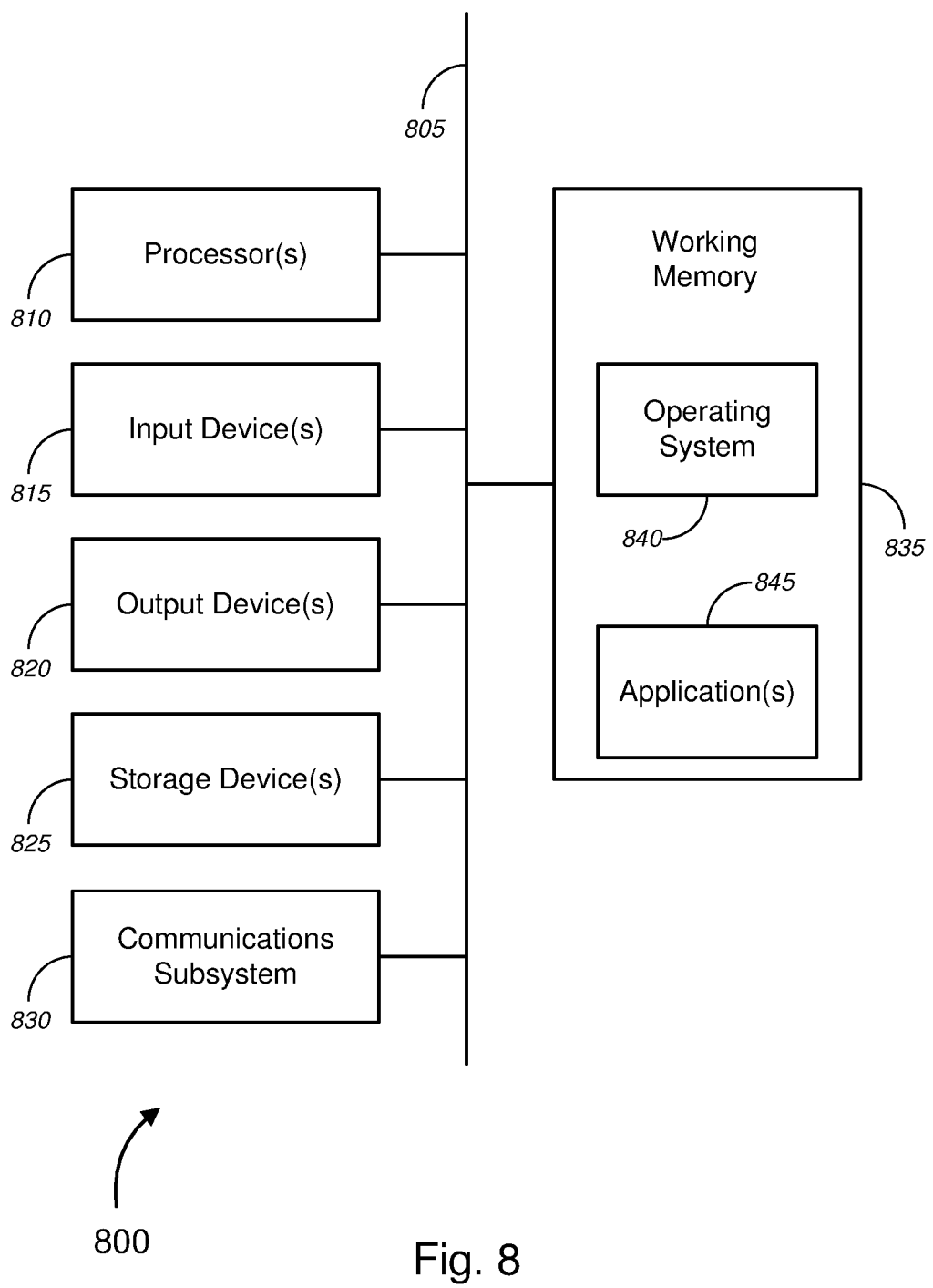
FIG. 8 is a block diagram illustrating an exemplary computer architecture, in accordance with various embodiments.

FIG. 8 is a block diagram illustrating an exemplary computer architecture, in accordance with various embodiments. FIG. 8 provides a schematic illustration of one embodiment of a computer system 800 that can perform the methods provided by various other embodiments, as described herein, and/or can perform the functions of remote terminal 135, the summary server 155, video/audio analyzer 165, and/or other computer systems as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer systems, and/or with any other devices described herein. In many embodiments, the computer system 800 will further comprise a working memory 835, which can include a RAM or ROM device, as described above.

The computer system 800 also may comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for auto-summarizing video or audio content, comprising:
    receiving, with a summary server, video or audio content from a content database;
    retrieving, with a summary server, one or more time codes from a time code database, each of the one or more time codes corresponding to each of one or more triggers, wherein the one or more triggers comprise at least one of one or more cue tones provided by a distributor of the video or a physical gesture captured by an image capturing device, wherein the physical gesture captured by the image capturing device comprises at least one of clapping, standing, pointing, or mass movement toward a person or object;
    determining, with the summary server, one or more segments of video or audio content corresponding to the one or more retrieved time codes associated with the one or more triggers;
    analyzing, with the summary server, the one or more segments of video or audio content corresponding to the one or more retrieved time codes associated with the one or more triggers;
    determining, with the summary server, one or more selected segments of video or audio content comprising at least one of the one or more cue tones provided by the distributor of the video or comprising the at least one of clapping, standing, pointing, or mass movement toward the person or the object exceeding a pre-set number of people performing the at least one of clapping, standing, pointing, or mass movement toward the person or object;
    based on a determination that at least one selected segment of video or audio content of the one or more selected segments of video or audio content comprises at least one of one or more cue tones provided by the distributor of the video or comprises the at least one of clapping, standing, pointing, or mass movement toward a person or an object exceeding the pre-set number of people performing the at least one of clapping, standing, pointing, or mass movement toward the person or the object,
    creating, with the summary server, one or more summary tracks, each of the one or more summary tracks comprising the at least one selected segment of video or audio content;
    compiling, with the summary server, the one or more summary tracks into a summary sequence;
    storing, with the summary server, the summary sequence in a summary database;
    transmitting, with the summary server, the summary sequence to at least one user device among a plurality of user devices over a network, wherein the plurality of user devices are associated with a plurality of users;
    wherein creating the one or more summary tracks and compiling the one or more summary tracks into a summary sequence comprises:
    determining, with the summary server, one or more adaptive bitrate ("ABR") streams from among a plurality of ABR streams of the video or audio content, based on determining which of the plurality of ABR streams correspond to the one or more selected segments of video or audio content, wherein each ABR stream comprises a portion of the video or audio content spanning a duration between 2 and 10 seconds;
    creating, with the summary server, a manifest file listing the one or more ABR streams; and
    streaming, with the summary server and based on the manifest file, the one or more ABR streams as the summary sequence to at least one user device among a plurality of user devices over a network, wherein the plurality of user devices are associated with a plurality of users.

2. The method of claim 1, wherein the one or more triggers are associated with one or more inputs received from at least one user of a plurality of users over a network, wherein the one or more triggers comprises an event comprising at least one of the at least one user actuating a button on at least one user device, the at least one user providing sound input into a microphone of at least one user device, or the at least one user providing a physical gesture captured by an image capturing device.

3. The method of claim 2, wherein the at least one user device includes a device comprising at least one of a television remote controller, a set-top box remote controller, a universal remote controller, a laptop computer, a desktop computer, a tablet computer, a POTS telephone, a VoIP telephone, a landline telephone, a mobile telephone, a smart phone, a personal digital assistant, a wireless microphone, a wired microphone, a gaming console, or a portable gaming device.

4. The method of claim 2, wherein actuating a button comprises at least one of depressing a hard button on the at least one user device, interacting with a touchscreen display of the at least one user device, toggling a switch on the at least one user device, or actuating a lever on the at least one user device, wherein interacting with a touchscreen display of the at least one user device includes at least one of actuating one or more soft buttons on the touchscreen display of the at least one user device, swiping a surface of the touchscreen display, or drawing a predetermined pattern on the touchscreen display, and wherein the sound input comprises at least one of one or more user-designated keywords, one or more default keywords, clapping sound, laughter, screaming, or shouting, wherein each of the clapping sound, laughter, screaming, and shouting exceeds a predetermined decibel level.

5. The method of claim 1, wherein the one or more triggers are associated with actions by a live audience, wherein each of the one or more triggers comprises an action causing a sound level exceeding a predetermined decibel level, wherein said action comprises at least one of an audience applauding, an audience laughing, an audience screaming, an audience shouting, or an audience whistling.

6. The method of claim 1, wherein each cue tone is based on a cue tone standard comprising at least one of Society of Cable Telecommunications Engineers ("SCTE") 35 standard or SCTE 130 standard.

7. The method of claim 1, further comprising analyzing the one or more time codes to determine at least one selected time code that corresponds to at least one of the one or more triggers, each of said at least one selected time code including a central selected time code and a range of time codes spanning a predetermined number of seconds before and after the central selected time code.

8. The method of claim 1, wherein each of the one or more summary tracks further comprises at least one of a back-stepped segment of the video or audio content or a forward-stepped segment of the video or audio content.

9. The method of claim 8, wherein each back-stepped segment includes a portion of the video or audio content extending over a first period from the corresponding selected time code backwards in time by a first duration, wherein each forward-stepped segment includes a portion of the video or audio content extending over a second period from the corresponding selected time code forwards in time by a second duration, wherein each of the first duration and second duration includes a duration comprising at least one of 30 seconds, 1 minute, 1.5 minutes, 2 minutes, 3 minutes, 5 minutes, 10 minutes, a range between 30 seconds and 10 minutes, a range between 30 seconds and 3 minutes, or a range between 2 minutes and 5 minutes.

10. A system for auto-summarizing video or audio content, comprising:
a time code database on which is stored one or more time codes, each of the one or more time codes corresponding to each of one or more triggers, wherein the one or more triggers comprise at least one of one or more cue tones provided by a distributor of the video or a physical gesture captured by an image capturing device, wherein the physical gesture captured by the image capturing device comprises at least one of clapping, standing, pointing, or mass movement toward a person or an object;
a summary server operatively coupled with the time code database, the summary server configured to:
receive video or audio content from a content database;
retrieve the one or more time codes from the time code database;
determine one or more segments of video or audio content corresponding to the one or more retrieved time codes associated with the one or more triggers;
analyze the one or more segments of video or audio content corresponding to the one or more retrieved time codes associated with the one or more triggers;
determine one or more segments of video or audio content comprising at least one of the one or more cue tones provided by the distributor of the video or comprising the at least one of clapping, standing, pointing, or mass movement toward the person or the object exceeding a pre-set number of people performing the at least one of clapping, standing, pointing, or mass movement toward the person or the object;
based on a determination that at least one selected segment of video or audio content of the one or more segments of video or audio content comprises at least one of one or more cue tones provided by the distributor of the video or comprises the at least one of clapping, standing, pointing, or mass movement toward a person or an object exceeding the pre-set number of people performing the at least one of clapping, standing, pointing, or mass movement toward the person or the object,
create one or more summary tracks, each of the one or more summary tracks comprising the at least one selected segment of video or audio content;
compile the one or more summary tracks into a summary sequence;
store the summary sequence in a summary database;
transmit the summary sequence to at least one user device among a plurality of user devices over a network, wherein the plurality of user devices are associated with a plurality of users;
determine one or more adaptive bitrate ("ABR") streams from among a plurality of ABR streams of the video or audio content, based on determining which of the plurality of ABR streams correspond to the one or more selected segments of video or audio content, wherein each ABR stream comprises a portion of the video or audio content spanning a duration between 2 and 10 seconds;
create a manifest file listing the one or more ABR streams; and
stream, based on the manifest file, the one or more ABR streams as the summary sequence to at least one user device among a plurality of user devices over a network, wherein the plurality of user devices are associated with a plurality of users.

11. The system of claim 10, wherein each of the one or more summary tracks further comprises at least one of a back-stepped segment of the video or audio content or a forward-stepped segment of the video or audio content.

12. The system of claim 11, wherein each back-stepped segment includes a portion of the video or audio content extending over a first period from the corresponding selected time code backwards in time by a first duration, wherein each forward-stepped segment includes a portion of the video or audio content extending over a second period from the corresponding selected time code forwards in time by a second duration, wherein each of the first duration and second duration includes a duration comprising at least one of 30 seconds, 1 minute, 1.5 minutes, 2 minutes, 3 minutes, 5 minutes, 10 minutes, a range between 30 seconds and 10 minutes, a range between 30 seconds and 3 minutes, or a range between 2 minutes and 5 minutes.

* * * * *